US011373066B2

(12) United States Patent
Lee et al.

(10) Patent No.: US 11,373,066 B2
(45) Date of Patent: Jun. 28, 2022

(54) DEEP MODEL MATCHING METHODS FOR IMAGE TRANSFORMATION

(71) Applicant: Leica Microsystems CMS GmbH, Wetzlar (DE)

(72) Inventors: Shih-Jong James Lee, Bellevue, WA (US); Hideki Sasaki, Bellevue, WA (US)

(73) Assignee: Leica Microsystems CMS GmbH, Wetzlar (DE)

( * ) Notice: Subject to any disclaimer, the term of this patent is extended or adjusted under 35 U.S.C. 154(b) by 233 days.

(21) Appl. No.: 16/416,115

(22) Filed: May 17, 2019

(65) Prior Publication Data

US 2020/0364494 A1 Nov. 19, 2020

(51) Int. Cl.

*G06K 9/62* (2022.01)
*G06N 3/04* (2006.01)
*G06K 9/00* (2022.01)
*G06V 30/194* (2022.01)

(52) U.S. Cl.

CPC ......... *G06K 9/627* (2013.01); *G06K 9/00523* (2013.01); *G06K 9/00536* (2013.01); *G06N 3/04* (2013.01); *G06V 30/194* (2022.01)

(58) Field of Classification Search

CPC .... G06K 9/6271; G06K 9/00523; G06K 9/66; G06K 9/00536; G06K 9/627; G06K 9/00127; G06N 3/04; G06N 3/0472; G06N 3/08; G06N 3/0454; G06V 30/194; G06V 20/69

See application file for complete search history.

(56) References Cited

U.S. PATENT DOCUMENTS

2020/0327134 A1* 10/2020 Freed ...................... G06F 16/22

FOREIGN PATENT DOCUMENTS

WO WO-2012151198 A1 * 11/2012 ............... G06N 3/08

OTHER PUBLICATIONS

Miao, Hui, et al. "On model discovery for hosted data science projects." Proceedings of the 1st Workshop on Data Management for End-to-End Machine Learning. 2017. (Year: 2017).*

Chard R, Li Z, Chard K, Ward L, Babuji Y, Woodard A, Tuecke S, Blaiszik B, Franklin MJ, Foster I. DLHub: Model and Data Serving for Science. arXiv preprint arXiv:1811.11213. Nov. 27, 2018. (Year: 2018).*

(Continued)

*Primary Examiner* — Vu Le
*Assistant Examiner* — Tracy Mangialaschi
(74) *Attorney, Agent, or Firm* — 2SPL Patent Attorneys PartG mbB; Yong Beom Hwang

(57) ABSTRACT

A computerized method of deep model matching for image transformation includes inputting pilot data and pre-trained deep model library into computer memories; performing a model matching scoring using the pilot data and the pre-trained deep model library to generate model matching score; and performing a model matching decision using the model matching score to generate a model matching decision output. Additional pilot data may be used to perform the model matching scoring and the model matching decision iteratively to obtain improved model matching decision output. Alternatively, the pre-trained deep model library may be pre-trained deep adversarial model library in the method.

19 Claims, 4 Drawing Sheets

(56) References Cited

OTHER PUBLICATIONS

Yang, Zijiang, et al. "Microstructural materials design via deep adversarial learning methodology." Journal of Mechanical Design 140.11 (2018). (Year: 2018).*

Feuz, Sandro and Carbune, Victor, "Ranking and automatic selection of machine learning models Abstract", Technical Disclosure Commons, (Dec. 13, 2017). (Year: 2017).*

* cited by examiner

DEEP MODEL MATCHING METHODS FOR IMAGE TRANSFORMATION

STATEMENT AS TO RIGHTS TO INVENTIONS MADE UNDER FEDERALLY SPONSORED RESEARCH AND DEVELOPMENT

This work was supported by U.S. Government grant number 5R44NS097094-03, awarded by the NATIONAL INSTITUTE OF NEUROLOGICAL DISORDERS AND STROKE. The U.S. Government may have certain rights in the invention.

BACKGROUND OF THE INVENTION

Field of the Invention

The present invention relates to image-based deep model learning. More particularly, the present invention relates to computerized methods of deep model matching for image transformation.

Description of the Related Art a. Description of Problem that Motivated Invention.

Many problems in image generation, image processing and computer vision require the transformation of an input image into an output image. The image transformation can be considered as transforming one possible representation of a scene into another. A scene may be represented as an RGB image, a gradient field, an edge map, a semantic label map, etc.

In the microscopy imaging fields, despite the rapid advancements in optics, lasers, probes, cameras and novel techniques, major factors such as spatial and temporal resolution, light exposure, signal-to-noise, depth of light penetration and probe spectra continue to limit the types of experiments that are possible. Experimentalists routinely need to trade off these factors. Many biological experiments cannot be performed as they would require very high temporal and spatial resolution which typically is only possible by exposing the sample to damaging amounts of light/energy causing photobleaching and/or phototoxicity. Also, the number of indicators that can be simultaneously observed within a sample is limited by probe spectral bleed-through.

b. How Did Prior Art Solve Problem?

Deep Learning (DL) is a type of Artificial Intelligence (AI) which has recently seen a rise in popular interest. This sudden boost has been fueled primarily by the invention of Convolutional Neural Networks (CNNs), a novel machine learning algorithmic architecture, as well as the availability of powerful and relatively cheap computing units. In the early 2010's CNNs became increasingly prominent as tools for image classification, showing superhuman accuracy at identifying objects in images. Since then, DL has expanded to many research fields, showing its potential to outsmart humans in board games such as Go, achieve self-driving cars and to significantly improve biomedical image analysis and diagnosis.

CNNs have been shown to be particularly well suited for image-based problems. Recently, a growing amount of biology studies have used CNNs to analyze microscopy data, laying the foundation for a fundamental change in how microscopy is performed and how imaging data is interpreted. The areas where AI has been applied include: image restoration, such as denoising and resolution enhancement; extraction of structures from label-free microscopy imaging, i.e. virtual staining and automated, accurate classification and segmentation of microscopy images.

However, these new methods have not been widely translated to new imaging applications, such as in the microscopy experiments. They are mostly used by a small number of pioneering research groups who are also engaged in methodology development. The delay between methodology developments and their adoption is due to several practical hurdles and challenges which are primarily linked to: expertise, computing, trust, training data and hyperparameters.

Users need to have extensive expertise to use multiple highly specialized tools and access to high-performance computing resources to cover the entire DL train-apply workflow. While performance, versatility, and speed of CNNs are likely to continue improving, several challenges remain. A frequently raised concern in the computer vision, image pattern recognition and microscopy community over AI is how much machine outputs can be trusted to truly represent data. This is a real concern since CNNs have been observed to cause image hallucinations or to fail catastrophically as a result of minute changes in the image. There is the danger of inferring unsubstantiated image details. There are anecdotal examples where networks have 'cheated' their way to high performance, e.g. by using nonsense features such as empty space to identify dead cells or by identifying patterns in the ordering of the data, not in the images themselves. This shows how much of the performance of DL methods relies on the qualification and normalization of training data sets. Furthermore, in the design of CNN architectures, choosing network parameters such as network depth, number of neural connections, learning rate and other hand-coded features of neural networks, also termed hyperparameters, has been a notoriously empirical endeavor. In order to accelerate the adoption of DL in image transformation and microscopy, a novel AI platform tailored for non-expert users is needed.

BRIEF SUMMARY OF THE INVENTION a. Objectives of the Invention

The primary objective of the invention is to provide an automated deep model matching method to select among the models of the target application the optimal model that matches the pilot data. The secondary objective of the invention is to provide a progressive deep model matching method to select among the models of the target application the optimal model that matches the pilot data. The third objective of the invention is to provide a user friendly and efficient framework for a user to easily adopt deep models for their target applications. The fourth objective of the invention is to provide a pre-trained deep model library optimized for the target applications. The fifth objective of the invention is to allow users to adopt the deep models in the pre-trained library by only specifying the target application and providing pilot data.

b. How Does this Invention Solve the Problem?

In the current invention, pre-trained deep model library is generated by expert users. Training data sets and ground truths (GTs) corresponding to different groups of metadata combinations and application target specifications are used to train and generate a set of deep models and included in the library. The models are optimized for the target applications by expert users having the needed expertise to set up optimal hyperparameters and acquire computing resources to generate the models. Image transformation artifacts are controlled during training and the models are validated to gain the trust of users.

Users can take advantage of the deep models in the pre-trained library by only specifying the target application and providing pilot data. The current invention performs deep model matching to select among the models of the target application the optimal model that matches the pilot data. If the matching model cannot be decided, additional pilot data will be requested for further matching. In this way, users can adopt the trustworthy optimal deep model without machine learning expertise, extensive computing and training data.

DETAILED DESCRIPTION OF THE PREFERRED EMBODIMENTS

The concepts and the preferred embodiments of the present invention will be described in detail in the following in conjunction with the accompanying drawings.

Figure 1:
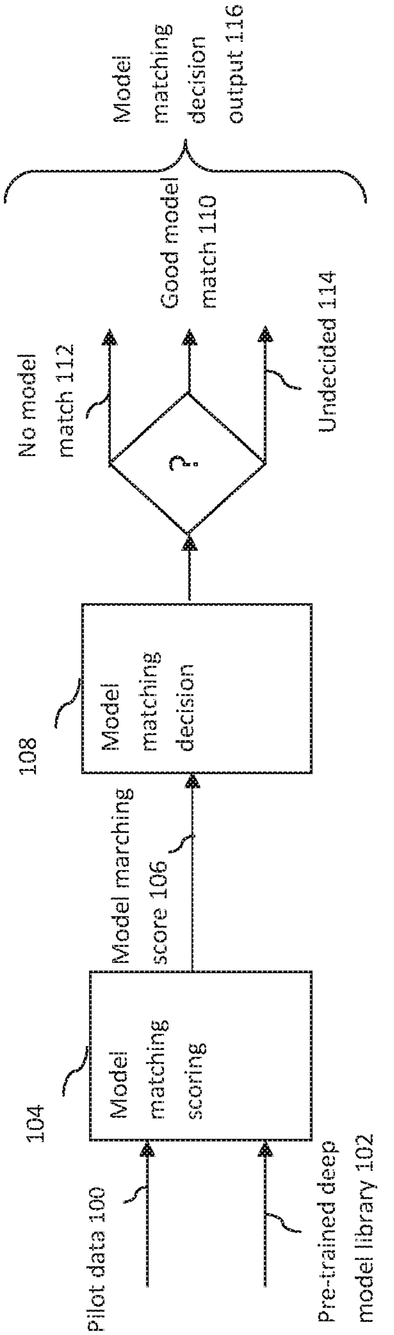
FIG. 1 shows the processing flow of the automated method of deep model matching for image transformation according to the present invention.

I. Computerized Method of Automated Deep Model Matching for Image Transformation FIG. 1 shows the processing flow of the automated method of deep model matching for image transformation of the current invention. The pilot data 100 and pre-trained deep model library 102 are entered into electronic storage means such as computer memories. The model matching scoring 104 is performed by computing means using the pilot data 100 and the pre-trained deep model library 102 to generate model matching score 106. The computing means include central processing unit (CPU), graphics processing unit (GPU), digital signal processor (DSP) from local and/or cloud platforms and/or mobile devices. The model matching decision 108 is performed by computing means using the model matching score 106 to generate a model matching decision output 116. The model matching decision output 116 is a decision that may be no model match 112, good model match 110 or undecided 114.

I.1 Pilot Data

In one embodiment of the invention, the pilot data includes a representative image, its metadata and application target specification. In the microscopy image application of the embodiment, the metadata includes a subset of data such as microscope types, objective lens, excitation light source, intensity, excitation and dichroic filters, emission filters (for florescence microscopy), detector gain and offset, pinhole size, sampling speed/exposure time, pixel dimensions (size, time point, focus position), etc. In addition, the specimen types and conditions such as live, fixed, organelle types, etc. are also stored as metadata.

The application target specification includes SNR (signal to noise ratio) restoration, super-resolution restoration, spatial deconvolution, spectral unmixing, virtual staining, etc. Those skilled in the art should recognize that other image transformation, prediction and translation applications could be covered as application targets of the current invention. In addition, the ground truth (GT) for the application target can be optionally provided. The GT can be paired (matching the representative image) or unpaired.

I.2 Pre-Trained Deep Model Library

A. Deep Model Architecture

The current invention is applicable to a broad range of deep models containing multiple layers of artificial neural networks such as convolutional deep neural networks (CNNs), recurrent neural networks (RNNs), generative adversarial networks (GANs) and their variants such as Unet, ResUNet, deep Residual Channel Attention Networks (RCAN), DenseUNet, Conditional Adversarial Networks (CAN), Bidirectional LSTM, Ensemble DNN/CNN/RNN, Hierarchical Convolutional Deep Maxout Network, etc.

Figure 2:
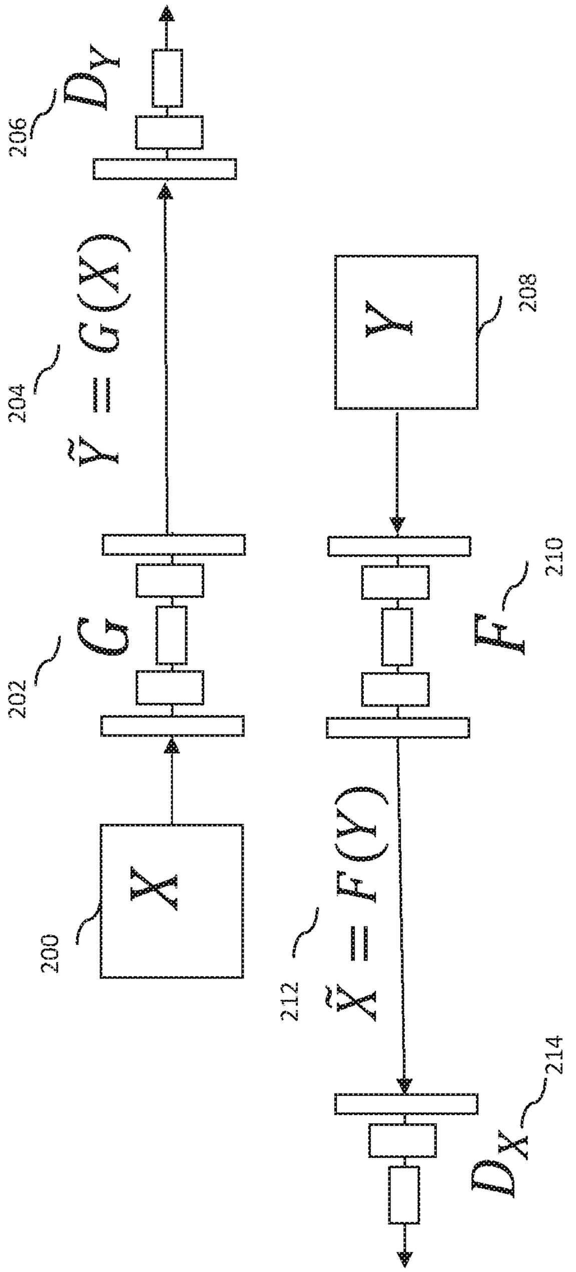
FIG. 2 shows the processing flow of one embodiment of the deep model architecture according to the present invention.

In one embodiment of the invention, as shown in FIG. 2, each deep model consists of a set of two generators G 202 and F 210, and two discriminators $D_X$ 214 and $D_Y$ 206, called bi-directional generative adversarial network model. In one implementation of the embodiment, U-Net is used as the generator and a convolutional "PatchGAN" classifier is used as the discriminator. PatchGAN only penalizes structure at the scale of image. The model is based on the Generative Adversarial Networks (GANs). GANs learn a loss function and a discriminator that tries to classify if the output image is real or fake, while simultaneously train a generative model (generator) to minimize this loss. Blurry images will not be tolerated since they look obviously fake. Because GANs learn a loss function that adapts to the data, they can be applied to a multitude of tasks that traditionally would require very different kinds of loss functions.

Each DL model set M consists of two generators G 202, F 210 and two discriminators $D_X$ 214 and $D_Y$ 206 that is, $M=(G, F, D_X, D_Y)$. The generator G 202 is a mapping function from input image domain X 200 to output image domain Y 208. That is $G: X \rightarrow Y$ resulting in $\tilde{Y}=G(X)$ 204. The generator F 210 is an inverse mapping function. That is $F: Y \rightarrow X$ resulting in $\tilde{X}=F(Y)$ 212. The two adversarial discriminators $D_X$ 214 and $D_Y$ 206 classify the mapped images $\tilde{X}=F(Y)$ 212 and $\tilde{Y}=G(X)$ 204 as real or fake.

The deep model architecture simultaneously trains the mapping function G 202 and the inverse mapping function F 210. In addition, two adversarial discriminators $D_X$ 214 and $D_Y$ 206 are trained. $D_X$ 214 aims to distinguish between X domain 200 images {x} and inverse mapped images {F(y)}; in the same way, $D_Y$ 206 aims to discriminate between Y domain 208 images {y} and mapped images {G(x)}.

In summary, the training aims to solve $$G^*,F^*=\arg\min_{G,F}\max_{D_X,D_Y}\mathcal{L}(G,F,D_X,D_Y)$$

The objective $\mathcal{L}$ contains two types of terms: two adversarial losses of Generative Adversarial Networks (GAN), $\mathcal{L}_{GAN}$, for matching the distribution of generated images {G(x)}, {F(y)} to the image distribution in the target domains {y} and {x} to evaluate how "realistic" an image created by the generator is; and cycle consistency (CYC) losses, $\mathcal{L}_{CYC}$, to prevent the learned mappings G 202 and F 210 from contradicting each other. That is, $$\mathcal{L}(G,F,D_X,D_Y)=\mathcal{L}_{GAN}(G,D_Y,X,Y)+\mathcal{L}_{GAN}(F,D_X,Y,X)+\lambda\mathcal{L}_{CYC}(G,F)$$

where λ controls the relative importance of the adversarial losses and cycle consistency losses;

$$\mathcal{L}_{GAN}(G,D_Y,X,Y)=\mathbb{E}_{y\sim Pdata(y)}[\log D_Y(y)]+\mathbb{E}_{x\sim Pdata(x)}[\log(1-D_Y(G(x))];$$

$$\mathcal{L}_{GAN}(F,D_X,Y,X)=\mathbb{E}_{x\sim Pdata(x)}[\log D_X(x)]+\mathbb{E}_{y\sim Pdata(y)}[\log(1-D_X(F(y))]\text{ and}$$

$$\mathcal{L}_{CYC}(G,F)=\mathbb{E}_{x\sim Pdata(x)}[\|F(G(x))-x\|_1]+\mathbb{E}_{y\sim Pdata(y)}[\|G(F(y))-y\|_1],$$

where $\mathbb{E}$ is the expected value of a function. That is, $\mathbb{E}_{z\sim Pdata(z)}[h(z)]=\int Pdata(z)h(z)dz$. Pdata (z) is the probability distribution of the data z.

The approach can handle paired and unpaired GT as the optimization can be performed over the whole distribution of target domains or the matching pairs. Note that the $L_1$ loss (absolute error) is used because the $L_1$ loss generally generates less blurred images. Those skilled in the art should recognize that the $L_2$ (squared error) or other norms such as $L_p$, $L_\infty$, etc. can be used that are optimal for different applications. Also note that while the log loss (the binary cross-entropy loss) is used in the above formulation, those skilled in the art should recognize that other loss functions such as the least-squares loss, the Wasserstein loss (the earth mover's distance) or the relativistic discriminator loss can be used that are optimal for different applications.

B. Deep Model Library Training

For data sets corresponding to different groups of metadata combinations and application target specifications, a set of deep models are generated and included in the library. In addition, the contrast measurements of the training data for each trained deep model can be extracted and stored in the library. In one embodiment of the invention, the contrast measurements include the distribution and summary statistics such as mean standard deviation, etc. of image contrasts.

In one embodiment of the invention, the training process samples (systematically or randomly) image sub-regions, qualify and normalize them and pair with their GTs for deep model training. The collection of deep models is stored in the library categorized by their metadata, application targets and contrast measurements.

I.3 Model Matching Scoring

Figure 3:
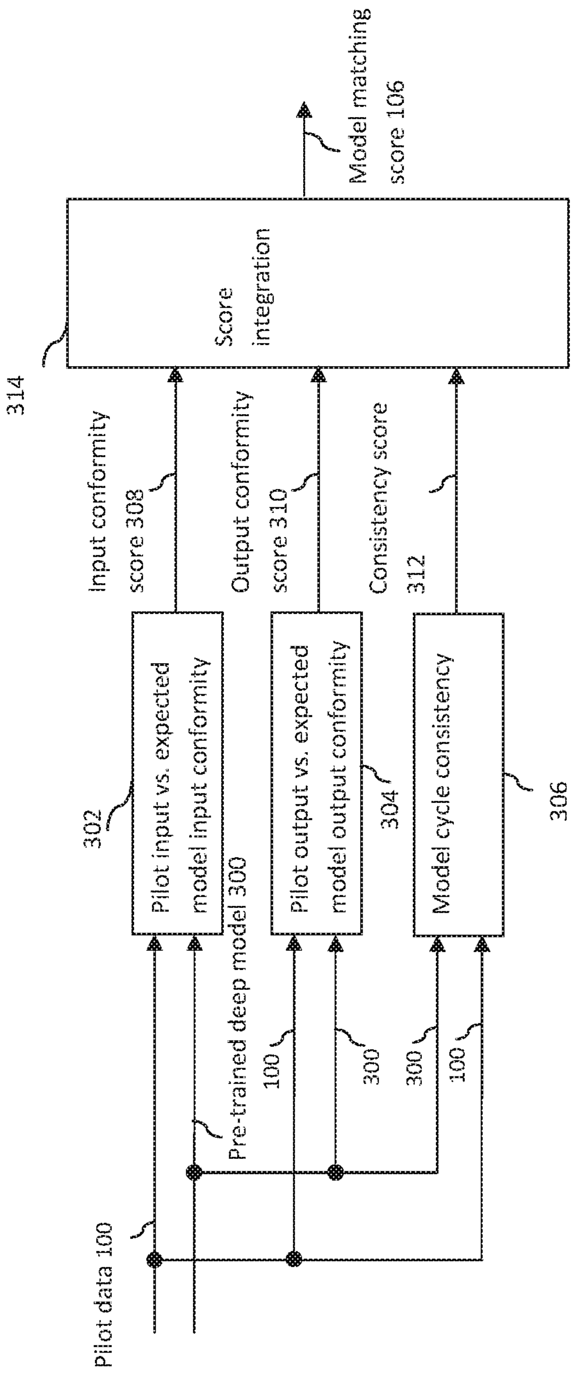
FIG. 3 shows the processing flow of one embodiment of the model matching scoring according to the present invention.

The model matching scoring 104 generates at least one model matching score 106 using the pilot data 100 and a pre-trained deep model 300 selected from the pre-trained deep model library 102. As shown in FIG. 3, the model matching evaluates the conformity of pilot data 100 and expected model input through a "pilot input vs. expected model input conformity" module 302. It can also evaluate the conformity of model output of pilot data 100 and expected model output through a "Pilot output vs. expected model output conformity" module 304. In addition, it can also evaluate the model cycle consistency to pilot data 100 through a "Model cycle consistency" module 306.

Given a pilot data 100, contrast measurements are performed first. The pre-trained deep model 300 is then selected based on its application target specification, metadata and contrast measurements. A plurality of candidate models that are close to the target and metadata specification and the contrast of pilot data can be selected and processed through the model matching scoring 104 one by one to generate and compare the model matching scores 106. As shown in FIG. 3, the "pilot input vs. expected model input conformity" module 302 generates an input conformity score 308. The "Pilot output vs. expected model output conformity" module 304 generates an output conformity score 310 and the "Model cycle consistency" module 306 generates a consistency score 312. The individual scores are processed by the score integration module 314 to integrate them into the model matching score 106. In one embodiment of the invention, the integration module 314 normalizes the three individual scores into the same range. This is followed by the integration of the three normalized scores. In one embodiment of the invention, the integration is performed by weighted sum or arithmetic mean or geometric means of the scores. In another embodiment, rank statistics such as median or minimum/maximum of the scores are used. Those skilled in the art should recognize that other integration methods can also be used.

In the embodiment of the deep model shown in FIG. 2, the scoring function $\mathcal{S}$ for $M=(G, F, D_X, D_Y)$ and their integration are defined to handle 3 cases of GT as follows:

Case 1. When $(x_p,y_p)$ is Paired:

$$\mathcal{S}(M,x_p,y_p)=-[D_Y(y_p)+D_X(x_p)]-\lambda D_Y(G(x_p))+\mu\|G(x_p)-y_p\|_1$$

The first term evaluates how "matching" of $(x_p, y_p)$ to the model by the model's discriminators directly. The second term evaluates how "realistic" model G's output is to input $x_p$. The third term evaluates the similarity between G's output and $y_p$. $\lambda$, $\mu$ are weights that can be trained or specified by users.

Case 2. When $(x_p,y_p)$ is Not Paired:

$$\mathcal{S}(M,x_p,y_p)=-[D_Y(y_p)+D_X(x_p)]-\lambda[D_Y(G(x_p))+D_x(F(y_p))]+\mu[\|F(G(x_p))-x_p\|_1+\|G(F(y_p))-y_p\|_1]$$

The first term evaluates how "matching" of $(x_p, y_p)$ to the model by the model's discriminators directly. The second term evaluates how "realistic" model F and G's outputs are. The third term evaluates cycle consistency losses of models G and F for $(x_p, y_p)$.

Case 3. When $y_p=\emptyset$:

$$\mathcal{S}(M,x_p,\emptyset)=-D_X(x_p)-\lambda D_Y(G(x_p))+\mu\|F(G(x_p))-x_p\|_1$$

When only input $x_p$ is available, the first term evaluates how "matching" of $x_p$ by the model's discriminator $D_X$ directly. The second term evaluates how "realistic" model G's output is. The third term evaluates the cycle consistency loss of models G and F for $x_p$.

As described above, the scoring function is flexible to allow paired or unpaired GTs. Even in the extreme case when no GT is available (that is $y_p=\emptyset$), a matching score can still be calculated based on just the contrast measurements, metadata and application target specification.

The model matching decision 108 can be formulated assuming lower score is better match. The candidate model sets {M} are applied to the pilot data $(x_p, y_p)$ for scoring and the best matching model set (lowest score) is selected: $M^s=\arg\min_M \mathcal{S}(M,x_p,y_p)$. In one embodiment of the invention, two thresholds $T_{low}$ and $T_{high}$ are set on the matching scores for each GT case. When the best matching score is below $T_{low}$, the good model match 110 decision will be made. When the best model matching score is above $T_{high}$, the no model match 112 decision is made. Otherwise, the decision will be undecided 114.

Figure 4:
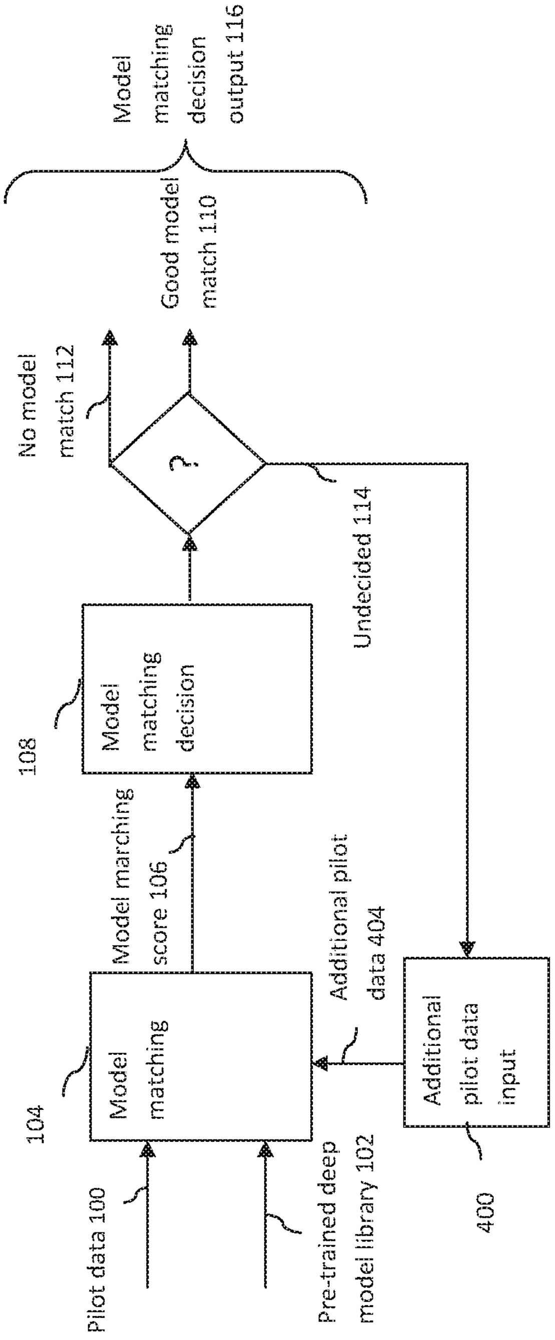
FIG. 4 shows the processing flow of the progressive method of deep model matching for image transformation according to the present invention.

II. Computerized Method of Progressive Deep Model Matching for Image Transformation FIG. 4 shows the processing flow of the progressive method of deep model matching for image transformation of the current invention. The pilot data 100 and pre-trained deep model library 102 are entered into electronic storage means such as computer memories. The model matching scoring 104 is performed by computing means using the pilot data and the pre-trained model library to generate model matching score 106. The computing means includes CPU, GPU, DSP from local or cloud platforms and/or mobile devices. The model matching decision 108 is performed by computing means using the model matching score 106 to generate a model matching decision output 116. The model matching decision output 116 is a decision that may be no model match 112, good model match 110 or undecided 114. If the model matching decision output 116 is undecided 114, an additional pilot data input 400 is performed. The additional pilot data 404 is added to pilot data 100 and the model matching scoring 104 and the model matching decision 108 is performed to generate a new model matching decision output 116. If the model matching decision output 116 is still undecided 114, the process will be repeated until either good model match 110 or no model match 112 is outputted or until a maximum number of repeats is reached. If the maximum number of repeats is reached, the model matching decision output 116 is set to no model match 112 and the progressive deep model matching process is completed.

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different equipment and devices, and that various modifications, both as to the equipment details and operating procedures, can be accomplished without departing from the scope of the invention.

What is claimed is:

1. A computerized method to automatically select a model among pre-training deep model library that matches pilot data for image transformation, the method comprising the steps of:

receiving pilot data and pre-trained deep model library including a set of pre-trained deep models into electronic storage means, wherein the pilot data is provided by a user;

performing a model matching scoring by computing means using the pilot data and the pre-trained deep model library to generate model matching score, wherein the model matching scoring is performed by evaluating a conformity of the pilot data and expected model input to generate an input conformity score, evaluating conformity of model output of the pilot data and expected model output to generate an output conformity score, and/or evaluating a model cycle consistency to the pilot data to generate a consistency score, and integrating the input conformity score, the output conformity score, and/or the consistency score to generate the model matching score; and performing a model matching decision using the model matching score to generate a model matching decision output, wherein the pilot data includes a representative image, its metadata, and application target specification.

2. The computerized method of claim 1, wherein the model matching decision output is selected from a group consisting of (1) good model match, (2) no model match, and (3) undecided.

3. The computerized method of claim 1, wherein the electronic storage means is in a cloud platform.

4. The computerized method of claim 1, wherein the computing means is in a cloud platform.

5. The computerized method of claim 1, wherein the image transformation is for microscopy image restoration.

6. The computerized method of claim 1, wherein the image transformation is for microscopy image prediction.

7. A computerized method to progressively select a model among pre-training deep model library that matches pilot data for image transformation, the method comprising the steps of:

a) receiving pilot data and pre-trained deep model library including a set of pre-trained deep models into electronic storage means, wherein the pilot data is provided by a user;

b) performing a model matching scoring by computing means using the pilot data and the pre-trained deep model library to generate model matching score, wherein the model matching scoring is performed by evaluating a conformity of the pilot data and expected model input to generate an input conformity score, evaluating conformity of model output of the pilot data and expected model output to generate an output conformity score, and/or evaluating a model cycle consistency to the pilot data to generate a consistency score, and integrating the input conformity score, the output conformity score, and/or the consistency score to generate the model matching score;

c) performing a model matching decision using the model matching score to generate a model matching decision output selected from a group consisting of (1) good model match, (2) no model match, and (3) undecided;

d) if the model matching decision output from step c) is undecided, then if step c) has been repeated for a predetermined maximum number of times, setting the model matching decision output to no model match and terminating the method; or if step c) has not been repeated for the maximum number of times, inputting additional pilot data and adding the additional pilot data to the pilot data and repeating steps b) through c); and e) if the model matching decision output from step c) is either good model match or no model match, terminating the method, wherein the pilot data includes a representative image, its metadata and application target specification.

8. The computerized method of claim 7, wherein the electronic storage means is in a cloud platform.

9. The computerized method of claim 7, wherein the computing means is in a cloud platform.

10. The computerized method of claim 7, wherein the image transformation is for microscopy image restoration.

11. The computerized method of claim 7, wherein the image transformation is for microscopy image prediction.

12. A computerized method for deep adversarial model matching to automatically select a model among pre-training deep model library that matches pilot data for image transformation, the method comprising the steps of:

receiving pilot data and pre-trained deep adversarial model library into electronic storage means, wherein the pilot data is provided by a user;

performing a model matching scoring by computing means using the pilot data and the pre-trained deep adversarial model library to generate model matching score, wherein the model matching scoring is performed by evaluating a conformity of the pilot data and expected model input to generate an input conformity score, evaluating conformity of model output of the pilot data and expected model output to generate an output conformity score, and/or evaluating a model cycle consistency to the pilot data to generate a consistency score, and integrating the input conformity score, the output conformity score, and/or the consistency score to generate the model matching score; and performing a model matching decision using the model matching score to generate a model matching decision output, wherein the pilot data includes a representative image, its metadata and application target specification.

13. The computerized method of claim 12, wherein the application target specification includes ground truth image, and the ground truth image is paired or un-paired.

14. The computerized method of claim 12, wherein the pre-trained deep adversarial model library uses bi-directional generative adversarial network model.

15. The computerized method of claim 12, wherein the model matching decision output is selected from a group consisting of (1) good model match, (2) no model match, and (3) undecided.

16. The computerized method of claim 12, wherein the electronic storage means is in a cloud platform.

17. The computerized method of claim 12, wherein the computing means is in a cloud platform.

18. The computerized method of claim 12, wherein the image transformation is for microscopy image restoration.

19. The computerized method of claim 12, wherein the image transformation is for microscopy image prediction.

* * * * *